(12) United States Patent
Ono et al.

(10) Patent No.: US 10,458,533 B2
(45) Date of Patent: Oct. 29, 2019

(54) COOLING SYSTEM FOR POWER TRANSMISSION UNIT

(71) Applicant: Toyota Jidosha Kabushiki Kaisha, Toyota-shi (JP)

(72) Inventors: Tomohito Ono, Susono (JP); Hiroto Hashimoto, Susono (JP); Hiroaki Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 518 days.

(21) Appl. No.: 15/273,169

(22) Filed: Sep. 22, 2016

(65) Prior Publication Data

US 2017/0097086 A1 Apr. 6, 2017

(30) Foreign Application Priority Data

Oct. 2, 2015 (JP) ................................ 2015-196682

(51) Int. Cl.
 *F16H 57/04* (2010.01)
 *B60K 6/365* (2007.10)
 (Continued)

(52) U.S. Cl.
 CPC ......... *F16H 57/0412* (2013.01); *B60K 6/365* (2013.01); *B60K 6/405* (2013.01); *B60K 6/445* (2013.01); *F16H 3/727* (2013.01); *F16H 57/0417* (2013.01); *F16H 57/0423* (2013.01); *F16H 57/0453* (2013.01); *F16H 57/0457* (2013.01); *F16H 57/0476* (2013.01); *F16H 57/0484* (2013.01); *B60Y 2200/92* (2013.01); *B60Y 2306/03* (2013.01); *B60Y 2306/05* (2013.01); *B60Y 2400/73* (2013.01);
 (Continued)

(58) Field of Classification Search
 CPC . F16H 57/0413; F16H 57/0412; F01M 5/002; Y10T 74/2189; F16N 39/02
 USPC .......................................... 474/6.22; 184/6.22
 See application file for complete search history.

(56) References Cited

U.S. PATENT DOCUMENTS 3,451,214 A * 6/1969 Bradley ................. B60B 33/04
                                                    184/6.22
4,444,292 A * 4/1984 Brown ..................... D03J 1/003
                                                     139/1 R
(Continued)

FOREIGN PATENT DOCUMENTS

CN 102869903 A 1/2013
DE 199 63 172 A1 6/2001
(Continued)

*Primary Examiner* — Henry Y Liu
(74) *Attorney, Agent, or Firm* — Oblon, McClelland, Maier & Neustadt, L.L.P.

(57) ABSTRACT

A cooling system for a power transmission unit that can cool a cooling site effectively is provided. The cooling system comprises: an oil pump; an oil cooler that cools the oil delivered from the oil pump; a first oil pipe for delivering the oil from the oil pump to the oil cooler; a second oil pipe for delivering the oil cooled by the oil cooler to a heat generating element. A housing chamber includes a high-temperature section where the heat generating element is arranged, and a low-temperature section. The second oil pipe is arranged in the housing chamber while passing through the low-temperature section, and an opening is formed on the second oil pipe in such a manner as to open toward the heat generating element.

3 Claims, 5 Drawing Sheets

(51) Int. Cl.
    *B60K 6/405*           (2007.10)
    *F16H 3/72*            (2006.01)
    *B60K 6/445*           (2007.10)
    *F16H 37/08*           (2006.01)

(52) U.S. Cl.
    CPC ......... *F16H 37/0806* (2013.01); *Y10S 903/91* (2013.01); *Y10S 903/952* (2013.01)

(56) References Cited

U.S. PATENT DOCUMENTS

| | | | | |
|---|---|---|---|---|
| 5,316,106 | A * | 5/1994 | Baedke | B60K 17/16 184/104.3 |
| 5,749,439 | A * | 5/1998 | Van Maanen | F16H 57/0412 184/104.1 |
| 6,012,550 | A * | 1/2000 | Lee | F16H 57/0412 165/300 |
| 6,021,868 | A * | 2/2000 | Bogema | F16H 57/0413 184/104.3 |
| 6,520,293 | B1 * | 2/2003 | Ogawa | F16H 57/0434 184/6.22 |
| 7,210,522 | B2 * | 5/2007 | Gruian | F01P 3/20 123/41.1 |
| 7,216,736 | B2 * | 5/2007 | Yamamoto | F16F 7/108 123/41.01 |
| 7,264,086 | B2 * | 9/2007 | Ito | F01M 5/002 123/196 R |
| 7,665,513 | B2 * | 2/2010 | Sasaki | F01P 11/08 123/196 AB |
| 8,522,744 | B2 * | 9/2013 | Takiguchi | F01M 5/002 123/196 R |
| 8,887,868 | B2 * | 11/2014 | Takayanagi | F03D 7/026 184/4 |
| 2006/0054411 | A1 * | 3/2006 | Fett | F16H 57/0412 184/6.22 |
| 2008/0135339 | A1 * | 6/2008 | Miller | B60K 6/26 184/6.22 |
| 2008/0236952 | A1 * | 10/2008 | Shimizu | F16H 57/0421 184/6.22 |
| 2009/0191060 | A1 * | 7/2009 | Bagepalli | F16H 57/0413 416/174 |
| 2009/0200114 | A1 * | 8/2009 | Bagepalli | F03D 80/70 184/6.22 |
| 2009/0283364 | A1 * | 11/2009 | Throop | F01M 5/001 184/6.22 |
| 2010/0000475 | A1 * | 1/2010 | Kardos | F01M 5/00 123/41.31 |
| 2010/0019505 | A1 * | 1/2010 | Frost | F01D 25/18 290/1 A |
| 2010/0025159 | A1 * | 2/2010 | Gmirya | B64C 27/12 184/6.4 |
| 2010/0065376 | A1 * | 3/2010 | Pursifull | F01M 5/001 184/6.22 |
| 2014/0158467 | A1 * | 6/2014 | Kimura | F01M 11/10 184/6.22 |
| 2015/0096841 | A1 * | 4/2015 | Bryde | B22D 17/00 184/6.22 |
| 2015/0176696 | A1 * | 6/2015 | Hidaka | F16H 57/0413 74/333 |

FOREIGN PATENT DOCUMENTS

| | | |
|---|---|---|
| DE | 10 2015 214 309 A1 | 2/2017 |
| JP | 2005-218271 | 8/2005 |
| JP | 2015-34581 | 2/2015 |

* cited by examiner

COOLING SYSTEM FOR POWER TRANSMISSION UNIT

CROSS REFERENCE TO RELATED APPLICATIONS

The present invention claims the benefit of priority to Japanese Patent Application No. 2015-196682 filed on Oct. 2, 2015 with the Japanese Patent Office, the entire contents of which are incorporated herein by reference in its entirety.

BACKGROUND

Field of the Invention

Embodiments of the present application relates to the art of a power transmission unit such as a transmission, a transaxle and a differential unit, and especially to a hydraulic cooling system for a power transmission unit.

Discussion of the Related Art

JP-A-2015-034581 describes an oil supply device of a hybrid vehicle having a first motor and a second motor. According to the teachings of JP-A-2015-034581, oil in a transmission is delivered to an oil sump passage by a rotation of a final gear to lubricate an oil requiring site. In the transmission, the oil is also delivered to an oil introduction passage by rotations of an output gear and a counter gear meshing with each other through a guide. Thus, the oil requiring site may be lubricated not only by the oil delivered through the oil sump passage but also by the oil delivered through the oil introduction passage. According to the teachings of JP-A-2015-034581, therefore, an ample amount of the oil can be applied to the oil requiring portion by the rotations of the output gear and the counter gear even if a rotational speed of the final gear is not high enough.

According to the teachings of JP-A-2015-034581, however, temperature of the oil thus circulating in the transmission may be raised gradually in spite of radiating heat through an oil pan. Especially, in the hybrid vehicle, oil temperature may be raised not only by friction heat resulting from rotations of the gears and shafts, but also by Joule heat resulting from operating the motors. For this reason, the transmission may not be cooled sufficiently by such splash lubrication of the oil.

In order to enhance cooling performance of the oil, an oil cooler may be arranged in the hybrid vehicle. In this case, however, a structure of the oil passage may be modified in such a manner as to deliver the oil cooled by the oil cooler effectively to a cooling site while reducing a cost.

SUMMARY

Aspects of preferred embodiments of the present application have been conceived noting the foregoing technical problems, and it is therefore an object of the present application is to provide a cooling system for a power transmission unit that can cool a cooling site effectively by oil cooled by an oil cooler, and that can reduce a manufacturing cost.

The present invention relates to a cooling system for a power transmission unit, comprising: an oil pump that pumps up oil in an oil pan and that discharges the oil therefrom; an oil cooler that cools the oil delivered from the oil pump; a first oil pipe for delivering the oil from the oil pump to the oil cooler; and a second oil pipe for delivering the oil cooled by the oil cooler to a heat generating element. In order to achieve the above-explained objective, according to the preferred embodiment of the present application, the cooling system is provided with a housing chamber including a high-temperature section where the heat generating element is arranged, and a low-temperature section where a temperature is lower than that in the high-temperature section. The second oil pipe is arranged in the housing chamber while passing through the low-temperature section, and an opening is formed on the second oil pipe in such a manner as to open toward the heat generating element.

In a non-limiting embodiment, the first oil pipe may be arranged in the housing chamber while passing through the high-temperature section.

In a non-limiting embodiment, the cooling system may be further provided with: a reservoir that is arranged in at least any one of the high-temperature section and the low-temperature section to hold the oil splashed in the housing chamber; and a fixing member that fix the first oil pipe to an inner face of the housing chamber above the reservoir in the high-temperature section, or that fix the second oil pipe to the inner face of the housing chamber above the reservoir in the low-temperature section.

In a non-limiting embodiment, the fixing member may comprise a guide portion that protrudes downwardly toward the reservoir.

Thus, according to the embodiment of the present application, the first oil pipe connecting the oil pump to the oil cooler, and the second oil pipe connecting the oil cooler to the heat generating element such as a motor are arranged in the housing chamber. Specifically, the first oil pipe extends from the oil pump to the oil cooler while passing thorough the high-temperature section where the motor is disposed, and the second oil pipe extends from the oil cooler to the motor while passing through the low-temperature section. In the cooling system, therefore, the oil cooled by the oil cooler can be delivered to the motor through the second oil pipe before warmed so that the motor can be cooled effectively. In addition, the heat of the oil flowing to the oil cooler from the first oil pipe warmed by the motor is radiated to the atmosphere through the oil cooler so that the motor can be further cooled by the oil delivered from the second oil pipe that has been cooled sufficiently.

As described, the first oil pipe and the second oil pipe may also serve individually as a guide member for guiding the oil adhering to the outer surface thereof to drip to a desired site. For this reason, the oil splashed in the housing chamber can be applied efficiently to the cooling site such as the motor. In addition, configurations, roots etc. of the first oil pipe and the second oil pipe may be altered to deliver the oil effectively to the lubricating site and the cooling site. Further, since the first oil pipe and the second oil pipe are arranged in the housing chamber, the oil leaks from the joint portion of the pipe can be caught by the reservoir such as a catch tank arranged in the housing chamber. For this reason, high sealing ability of the joint portion of the pipe is not required and hence a manufacturing cost of the cooling system can be reduced.

In addition, the oil pipes may be arranged between the casing and the catch tank without causing an interference with other gears. That is, the oil pipes may be arranged in the housing chamber without enlarging the housing chamber.

Specifically, the fixing member fixes the first oil pipe or the second oil pipe to the inner face of the housing chamber above the catch tank in an inclined manner. In the housing chamber, therefore, the oil splashed by a differential gear or the like adheres to an outer surface of the oil pipe, and the oil adhering to the outer surface of the oil pipe is guided to the fixing member and the guide portion to drip gravitationally to the catch tank. Thus, the splashed oil may be collected efficiently by the catch tank to be applied to desired lubricating sites.

Further, since the first pipe and the second pipe are arranged in the housing chamber, the oil can be circulated within the housing chamber. For this reason, the catch tank can be downsized and an amount of the oil can be reduced to reduce the cost of the cooling system.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 5b is a cross-sectional view along a line A-A in FIG. 5a; and

DETAILED DESCRIPTION OF THE PREFERRED EMBODIMENT(S)

Figure 1:
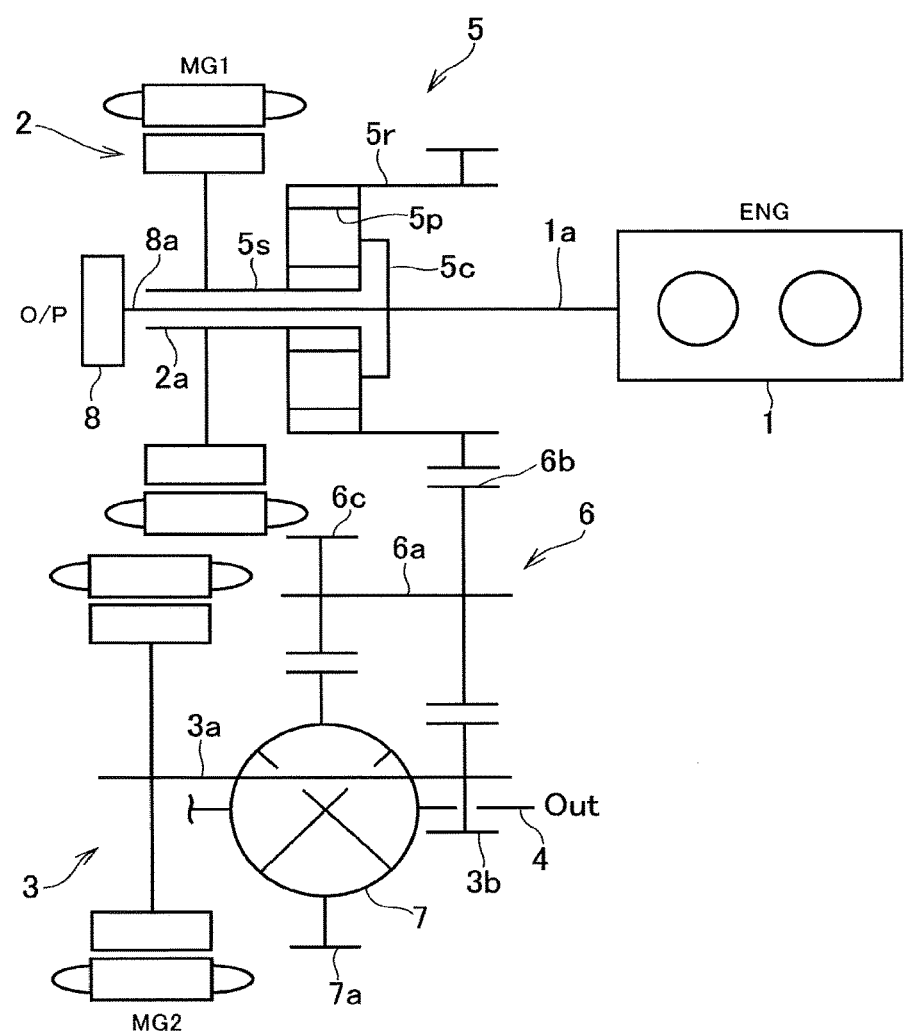
FIG. 1 is a schematic illustration showing one example of a powertrain to which the cooling system according to the embodiment is applied.

Preferred embodiment of the present application will now be explained with reference to the accompanying drawings. Referring now to FIG. 1, there is shown one example of a powertrain of a hybrid vehicle Ve to which the cooling system according to the embodiment is applied. Specifically, the vehicle Ve is a so-called a "two-motor type" hybrid vehicle in which a prime mover includes an engine (referred to as "ENG" in FIG. 1) 1 such as a gasoline engine and a diesel engine, a first motor (referred to as "MG1" in FIGS. 1 and 2) 2, and a second motor (referred to as "MG2" in FIGS. 1 and 2) 3. An output power of the engine 1 is distributed to the first motor 2 and to a driveshaft 4, and an output power of the second motor 3 is delivered directly to the driveshaft 4.

Each of the first motor 3 and the second motor 4 is a motor-generator that is operated as a motor by applying an electric power thereto generate a torque, and that is operated as a generator by applying a torque thereto to generate an electric power. For example, a permanent magnet synchronous motor and an induction motor are especially suitable to use as the first motor 3 and the second motor 4.

A power distribution device 5 as a single-pinion planetary gear unit is connected to an output shaft 1a of the engine 1 to distribute output power of the engine 1 to the first motor 4 and to the drive shaft 4. The power distribution device 5 is adapted to perform a differential action among a sun gear 5s, a ring gear 5r as an internal gear arranged concentrically with the sun gear 5s, and a carrier 5c supporting pinion gears interposed between the sun gear 5s and the ring gear 5r in a rotatable and revolvable manner.

To this end, in the power distribution device 5, the carrier 5c is connected to the output shaft 1a of the engine 1, the sun gear 5s is connected to a rotary shaft 2a of the first motor 2, and the ring gear 5r is connected to the driveshaft 4 and to a rotary shaft 3a of the second motor 3.

Specifically, the ring gear 5r of the power distribution device 5 is connected to the driveshaft 4 through a counter gear unit 6 and the differential gear unit 7. The counter gear unit 6 includes a countershaft 6a, a diametrically larger gear 6b fitted onto one end the countershaft 6a to be meshed with the ring gear 5r of the power distribution device 5, and a diametrically smaller gear 6c fitted onto the other end the countershaft 6a to be meshed with a ring gear 7a of the differential gear unit 7 connected to the driveshaft 4. Thus, the engine 1 and the first motor 4 are connected to the driveshaft 4 through the power distribution device 5, the counter gear unit 6 and the differential gear unit 7.

Whereas, an output power of the second motor 3 is delivered directly to the driveshaft 4 through the counter gear unit 6 and the differential gear unit 7, without passing through the power distribution device 5. Specifically, a drive gear 3b is fitted onto the rotary shaft 3a of the second motor 3 to be meshed with the diametrically larger gear 6b of the counter gear unit 6. That is, the second motor 3 is connected not only to the driveshaft 4 through the counter gear unit 6 and the differential gear unit 7, but also to the ring gear 5r of the power distribution device 5 through the counter gear unit 6. Since a diameter of the drive gear 3b is smaller than that of the diametrically larger gear 6b of the counter gear unit 6, a gear pair of the drive gear 3b and the diametrically larger gear 6b serves as a final reduction.

In order to cool and lubricate the power distribution device 5, and to reduce fevers of the first motor 2 and the second motor 3 resulting from an iron loss or a copper loss, a rotor shaft 8a of an oil pump 8 is also connected to the carrier 5c of the power distribution device 5. The oil pump 8 is a conventional oil pump used in automobiles that is driven by the output torque of the engine 1 to discharge pressurized oil. To this end, specifically, the rotor shaft 8a of the oil pump 8 is rotated together with the output shaft 1a of the engine 1. Alternatively, an electric oil pump that is driven electrically may also be used in the powertrain shown in FIG. 1.

Figure 2:
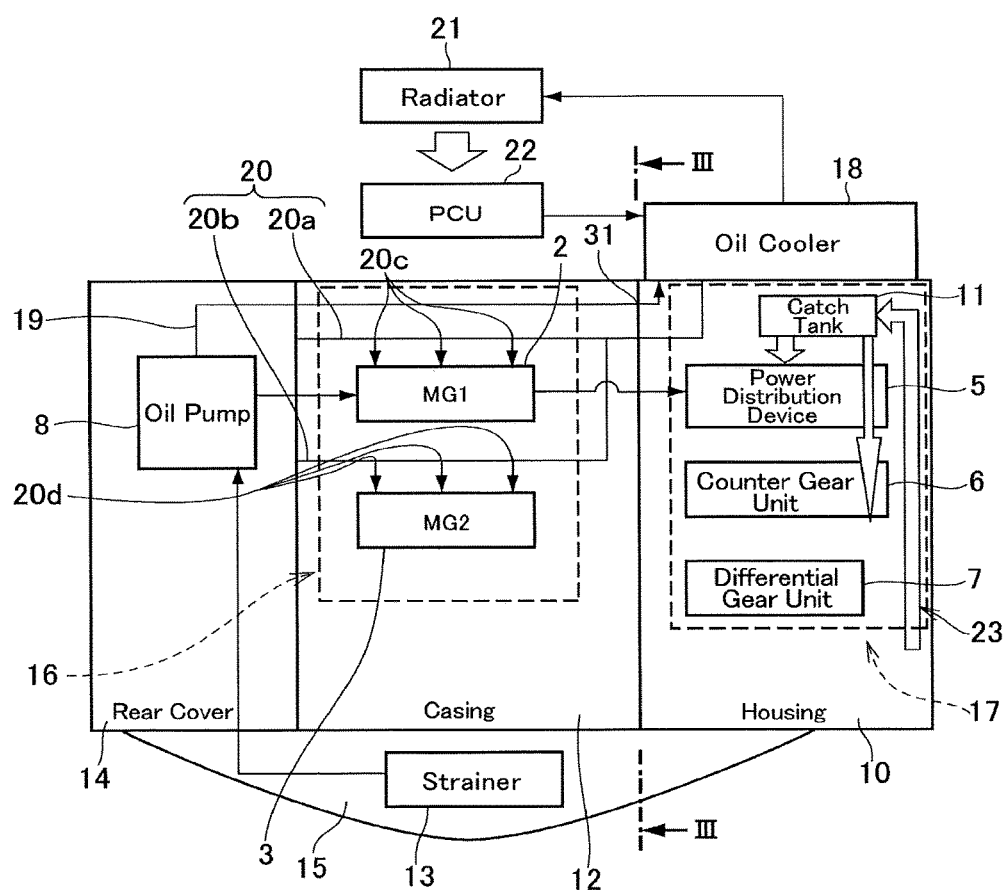
FIG. 2 is a schematic illustration showing a flow of oil in the cooling system.

Turning to FIG. 2, there is shown a flow of the oil discharged from the oil pump 8 to the power distribution device 5, the first motor 2 and the second motor 3. As shown in FIG. 2, the power distribution device 5, the counter gear unit 6, the differential gear unit 7, and a catch tank 11 as a reservoir for holding splashing oil are arranged in a housing 10. Whereas, the first motor 2 and the second motor 3 as heat generating elements are held in a casing 12 such as a transaxle casing, and the oil pump 8 is held in a rear cover 14. Thus, the housing 10, the casing 12 and the rear cover 14 form a housing chamber. In addition, a strainer 13 for removing contaminant such as metal powder from the oil, and an oil pan 15 are arranged underneath a bottom of the housing chamber.

An amount of heat generation of each of the first motor 2 and the second motor 3 is individually greater than an amount of friction heat resulting from rotations of the shafts and gears. In the following explanation, therefore, a space around the first motor 2 and the second motor 3 will be called a high-temperature section 16, and a space around the catch tank 11, the power distribution device 5, the counter gear unit 6 and the differential gear unit 7 will be called a low-temperature section 17. In order to cool the oil discharged from the oil pump 8 by cooling water, an oil cooler 18 is arranged outside of the housing 10. The cooling water warmed as a result of cooling the oil is delivered to a radiator 21 to radiate heat thereof to an atmosphere. The cooling water thus cooled by the radiator 21 is further delivered to cool a power control unit (abbreviated as "PCU" in FIG. 2) 22 for controlling an output power of a battery (not shown) to operate the motors 2 and 3, and then returned to the oil cooler 18.

The oil pump 8 is connected to the oil cooler 18 though a first oil pipe 19, and the oil cooler 18 is connected to the first motor 2 and the second motor 3 through a second oil pipe 20.

As indicated by arrows in FIG. 2, the oil in the oil pan 15 is pumped up by the oil pump 8 through a strainer pipe. The oil discharged from the oil pump 8 is partially delivered to the power distribution device 5 arranged in the low-temperature section 17 through an existing oil passage via the first motor 2 to lubricate the power distribution device 5, and partially delivered to the oil cooler 18 to be cooled through the first oil pipe 19 passing through the high-temperature section 16 where the first motor 2 and the second motor 3 are arranged. The oil delivered to the oil cooler 18 is further delivered to the high-temperature section 16 through the second oil pipe 20 to cool the first motor 2 and the second motor 3. Whereas, in the low-temperature section 17, a splash lubricating device 23 is arranged to lubricate the elements arranged in the low-temperature section 17 also by the oil splashed up by the differential gear unit 7.

Thus, the elements arranged in the low-temperature section 17 may be lubricated not only by the oil discharged from the oil pump 8 but also by the oil splashed up by the splash lubricating device 23. In addition, the first motor 2 and the second motor 3 as heat generating elements may be cooled effectively by the oil flowing through the first oil pipe 19 and by the oil applied from the second oil pipe 20.

To this end, specifically, the first oil pipe 19 extends widthwise in the housing chamber from the oil pump 8 arranged in the rear cover 14 to the oil cooler 18 arranged outside of the housing 10 while passing through the high-temperature section 16. In the housing chamber, therefore, heats of the first motor 2 and the second motor 3 can be drawn by the oil flowing from the oil pump 8 toward the oil cooler 18 through the first oil pipe 19.

The second oil pipe 20 is also arranged in the housing chamber from the oil cooler 18 to the first motor 2 and the second motor 3 via the low-temperature section 17, while being divided into a first branch 20a extending along a rotational axis of the first motor 2 and a second branch 20b extending along a rotational axis of the second motor 3. An example of arranging the second oil pipe 20 in gear box of a transaxle is shown in FIG. 3.

Figure 3:
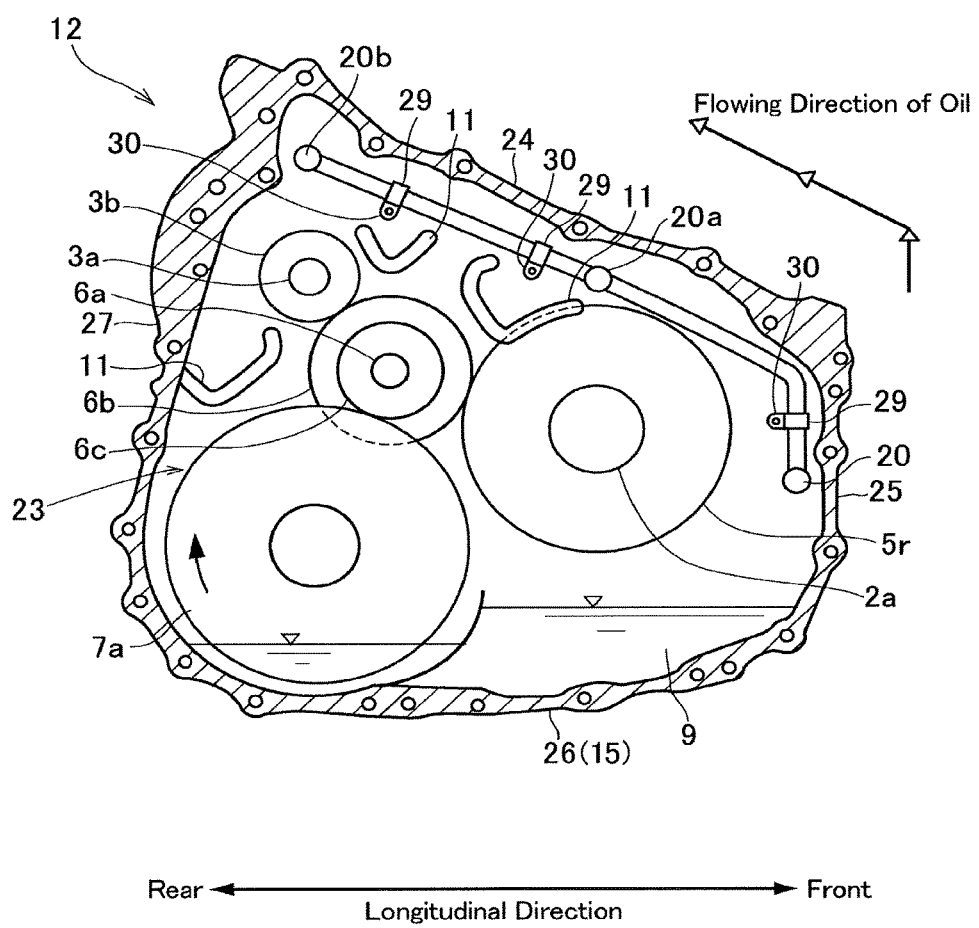
FIG. 3 is a cross-sectional view of the transmission along III-III line in FIG. 2.

As illustrated in FIG. 3, the casing 12 of the transaxle is formed of an upper wall 24, a front wall 25, a bottom wall 26 and a rear wall 27. In the casing 12, the second oil pipe 20 extends along the first motor 2 between an upper wall 24 of the casing 12 and the catch tanks 11 in such a manner as not to cause an interference with other gears. The ring gear 7a of the differential gear unit 7 serving as the splash lubricating device 23 is disposed at the lower rear corner in such a manner that a shaft thereof extends in the width direction of the vehicle Ve.

The countershaft 6a of the counter gear unit 6 is situated above the ring gear 7a but slightly closer to the front wall 25 so that the diametrically smaller gear 6c fitted onto the countershaft 6a is meshed with the ring gear 7a. On the other hand, the diametrically larger gear 6b that is also fitted onto the countershaft 6a is meshed with the drive gear 3b and the ring gear 5r of the power distribution device 5. The catch tank 11 is individually arranged above each of the first motor 2 and the second motor 3 to hold the oil splashed by the splash lubricating device 23. In the casing 12, the bottom wall 26 serves as the oil pan 15, and the oil 9 is held in the oil pan 15 at a level at which only a lower portion of the ring gear 7a is immersed into the oil 9.

Specifically, one of the end portions of the second oil pipe 20 of the front wall 25 side is connected to the oil cooler 18, and extends in the longitudinal direction of the vehicle Ve along inner surfaces of the front wall 25 and the upper wall 24 to a corner between the upper wall 24 and the rear wall 27. The first branch 20a is branched from the second oil pipe 20 at a point above the first motor 2 to extend in the width direction of the vehicle Ve, and the second branch 20b is branched from the second oil pipe 20 at a point above the second motor 3 to extend also in the width direction of the vehicle Ve. The first branch 20a has at least one first opening 20c opening toward the first motor 2, and the second branch 20b also has at least one second opening 20d opening toward the second motor 3.

In the casing 12, therefore, the oil cooled by the oil cooler 18 is delivered to the first branch 20a and the second branch 20b via the low-temperature section 17, and the first motor 2 and the second motor 3 are cooled individually by the oil dripping from the first opening(s) 20c and by the oil dripping from the second opening(s) 20d.

Figure 4:
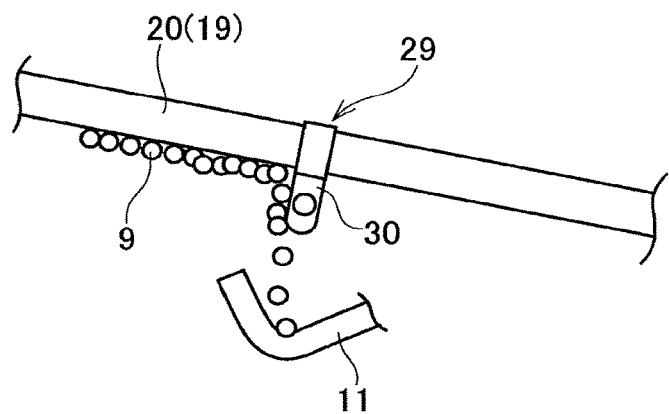
FIG. 4 is a schematic illustration showing a fixing member attached to the first oil pipe or the second oil pipe.

The second oil pipe 20 is fixed to the inner surface of the casing 12 by at least one fixing member 29 such as a bracket, a saddle etc. fitted onto the second oil pipe 20. The fixing member 29 is adapted not only to fix the second oil pipe 20 to the inner surface of the casing 12 but also to guide the splashed oil adhering to an outer surface of the second oil pipe 20 to the catch tank 11. A structure of the fixing member 29 is illustrated in an enlarged scale in FIG. 4. As illustrated in FIG. 4, the fixing member 29 is situated above the catch tank 11 in the low temperature section 17, and provided with a guide portion 30 protruding downwardly to guide the oil 9 adhering to the outer surface of the second oil pipe 20 gravitationally to the catch tank 11. Optionally, the above-explained first pipe 19 may also be fixed by the fixing member 29.

Figure 5A:
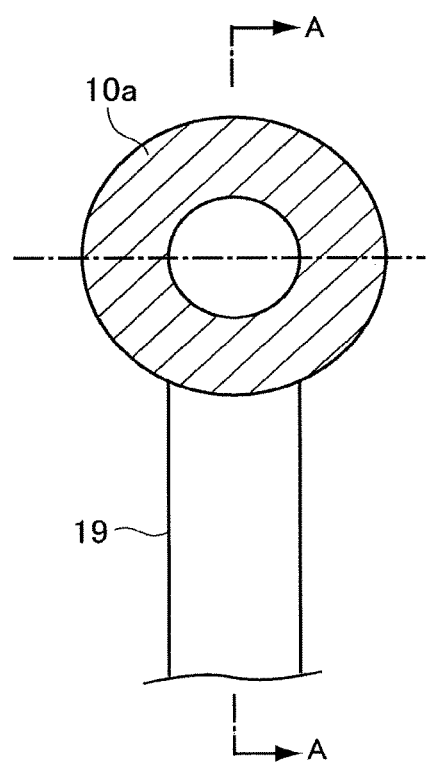
FIG. 5a is a cross-sectional view showing a joint portion of the first oil pipe.
Figure 5B:
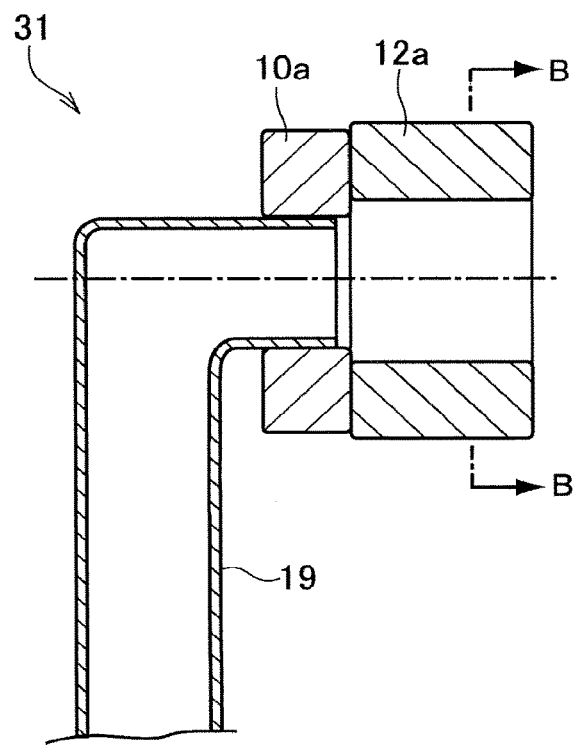
Figure 5C:
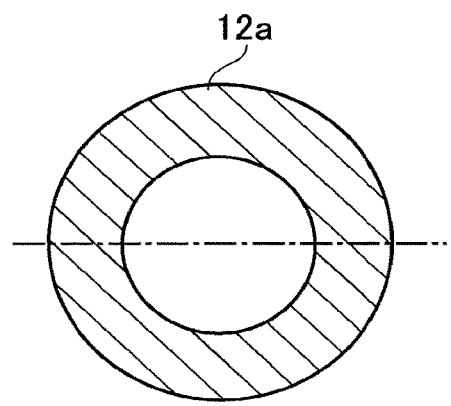
FIG. 5c is a cross-sectional view along a line B-B in FIG. 5b.

At a joint portion between the housing 10 and the casing 12, end portions of the first oil pipe 19 in the housing 10 and the casing 12 are joined to each other. That is, an oil leak may occur at the joint portion 31 between the housing 10 and the casing 12. According to the embodiment, as shown in FIGS. 5a, 5b, and 5c, a diametrically larger first flange 12a may be protruded from a partition wall of the casing 12 toward the housing 10 and a diametrically smaller second flange 10a a may be protruded from a partition wall of the housing 10 toward the casing 12, and end portions of the first pipe 19 are joined to each other within the first flange 12a and the second flange 10a. In this case, the oil leaks from the connection between the housing 10 and the casing 12 or the end portions of the first oil pipe 19 may be guided to drip to the oil pan 15 by a lower edge of the first flange 12a.

Here will be explained an action of the cooling system according to the embodiment. As described, in the casing 12, the oil in the oil pan 15 is pumped up by the oil pump 8. The oil discharged from the oil pump 8 is partially delivered to the power distribution device 5 through an existing oil passage via the first motor 2, and partially delivered to the oil cooler 18 through the first oil pipe 19. The oil cooled by the oil cooler 18 is further delivered to the first motor 2 and the second motor 3 through the second oil pipe 20. The first oil pipe 19 is arranged in the housing chamber in such a manner as to extend from the oil pump 8 to the oil cooler 18, and the second oil pipe 20 is also arranged in the housing chamber in such a manner as to extend from the oil cooler 18 to the first motor 2 and the second motor 3. In the cooling system, therefore, the oil discharged from the oil pump 8 flows to the oil cooler 18 through the first oil pipe 19 while cooling the first motor 2 and the second motor 3, and the oil cooled by the oil cooler 18 is delivered to the first motor 2 and the second motor 3 though the first branch 20a and the second branch 20b of the second oil pipe 20 to cool coil ends of the first motor 2 and the second motor 3.

Thus, the oil cooled by the oil cooler 18 can be delivered to the first motor 2 and the second motor 3 through the second oil pipe 20 before warmed so that the first motor 2 and the second motor 3 can be cooled effectively. In addition, the heat of the oil flowing to the oil cooler 18 from the first oil pipe 19 warmed by the first motor 2 and the second motor 3 is radiated to the atmosphere through the radiator 21 so that the first motor 2 and the second motor 3 can be further cooled by the oil delivered from the second oil pipe 20 that has been cooled sufficiently.

The first oil pipe 19 and the second oil pipe 20 may also serve individually as a guide member for guiding the oil adhering to the outer surface of the pipes 19 and 20 to drip to a desired site. For this reason, the first motor 2 and the second motor 3 can be cooled certainly.

In addition, configurations, roots etc. of the first oil pipe 19 and the second oil pipe 20 may be altered to deliver the oil effectively to the lubricating site and the cooling site.

Since the first oil pipe 19 and the second oil pipe 20 are arranged in the housing chamber, the oil leaks from the joint portion of the pipe can be collected by the oil pan 15. For this reason, high sealing ability of the joint portion of the pipe is not required. As also described, the flange portions having different diameters may be formed optionally around the joint portion between the end portions of the first pipe 19. In this case, the oil leaks from the connection between the housing 10 and the casing 12 or the end portions of the first oil pipe 19 may be guided to drip easily to the oil pan 15 by a lower edge of the diametrically larger flange.

Further, since the first oil pipe 19 and the second oil pipe 20 are arranged inside of the housing chamber, number of parts of the pipes 19 and 20 can be reduced to save the cost in comparison with a case of arranging the pipes outside of the housing chamber.

Turning back to FIG. 3, the lower portion of the ring gear 7a is immersed into the oil held in the oil pan 15, and the ring gear 7a is rotated in the direction indicated by the arrow. Consequently, the oil in the oil pan 15 is splashed upwardly along the inner face of the rear wall 27 to cool and lubricate the drive gear 3b, the diametrically smaller gear 6c, the diametrically larger gear 6b and so on. The oil thus splashed by the ring gear 7a is partially caught by the catch tanks 11 situated above the first motor 2 and the second motor 3, and delivered to desired lubricating sites.

In addition, the splashed oil adhering to the outer surface of the first pipe 19 and the second pipe 20 is guided by the guide portion 30 of the fixing member 29 to drip toward the catch tank 11. For this reason, the heat generating elements such as the first motor 2 and the third motor 3 can be cooled effectively.

Further, since the first oil pipe 19 and the second pipe 20 are arranged in the housing chamber, the oil can be circulated within the housing chamber holding the power distribution device 5. For this reason, the catch tank 11 can be downsized and an amount of the oil can be reduced to reduce the cost of the cooling system. In addition, the oil can be cooled without requiring an additional power source so that the structure of the cooling system can be simplified.

Although the above exemplary embodiments of the present application have been described, it will be understood by those skilled in the art that the present application should not be limited to the described exemplary embodiments, and various changes and modifications can be made within the spirit and scope of the present application. For example, the cooling system according to the embodiment may also be applied to an electric vehicle that is powered only by a motor.

What is claimed is:

1. A cooling system for a power transmission unit, comprising:
    an oil pump that pumps up oil in an oil pan and that discharges the oil therefrom;
    an oil cooler that cools the oil delivered from the oil pump;
    a first oil pipe for delivering the oil from the oil pump to the oil cooler;
    a second oil pipe for delivering the oil cooled by the oil cooler to a heat generating element; and
    a housing chamber including a high-temperature section where the heat generating element is arranged, and a low-temperature section where a temperature is lower than that in the high-temperature section;
    wherein the second oil pipe is arranged in the housing chamber while passing through the low-temperature section,
    wherein an opening is formed on the second oil pipe in such a manner as to open toward the heat generating element, and
    wherein the first oil pipe is arranged in the housing chamber while passing through the high-temperature section.

2. The cooling system for a power transmission unit as claimed in claim 1, further comprising:
    a reservoir that is arranged in at least any one of the high-temperature section and the low-temperature section to hold the oil splashed in the housing chamber; and
    a fixing member that fix the first oil pipe to an inner face of the housing chamber above the reservoir in the high-temperature section, or that fix the second oil pipe to the inner face of the housing chamber above the reservoir in the low-temperature section.

3. The cooling system for a power transmission unit as claimed in claim 2, wherein the fixing member comprises a guide portion that protrudes downwardly toward the reservoir.

* * * * *